(12) United States Patent
Arnold et al.

(10) Patent No.: US 8,353,534 B2
(45) Date of Patent: Jan. 15, 2013

(54) VEHICLE HAVING UTILITY BED AND PASSENGER RESTRAINT ASSEMBLY

(75) Inventors: David W. Arnold, Glendale, CA (US); Craig Mitchell, Huntington Beach, CA (US); Justin Michael Winter, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 489 days.

(21) Appl. No.: 12/646,160

(22) Filed: Dec. 23, 2009

(65) Prior Publication Data

US 2011/0148088 A1    Jun. 23, 2011

(51) Int. Cl.
| B60R 22/00 | (2006.01) |
| B60R 21/02 | (2006.01) |
| B60R 21/11 | (2006.01) |
| B60R 21/13 | (2006.01) |
| B60P 1/04 | (2006.01) |
| B60P 1/28 | (2006.01) |
| B61D 9/00 | (2006.01) |
| B60N 2/02 | (2006.01) |

(52) U.S. Cl. ............ 280/801.1; 280/808; 280/748; 280/756; 296/68.1; 296/64; 298/17 R

(58) Field of Classification Search .......... 280/756, 280/801.1, 808, 748; 298/17 R; 296/68.1, 296/64

See application file for complete search history.

(56) References Cited

U.S. PATENT DOCUMENTS

| 3,840,263 A | 10/1974 | Bowden |
| 4,400,013 A * | 8/1983 | Imai ............................ 280/801.1 |
| 4,480,868 A | 11/1984 | Koto |
| 4,750,778 A | 6/1988 | Hoban |
| 4,813,706 A * | 3/1989 | Kincheloe ..................... 280/756 |
| 4,842,458 A | 6/1989 | Carpenter |
| 4,973,082 A * | 11/1990 | Kincheloe ..................... 280/756 |
| 5,029,928 A | 7/1991 | Huber |
| 5,044,459 A | 9/1991 | Nishikaji |
| 5,106,121 A * | 4/1992 | Boone ........................... 280/807 |
| 5,934,727 A | 8/1999 | Storc et al. |
| 5,979,964 A | 11/1999 | Ban et al. |
| 6,059,499 A | 5/2000 | Bird |
| 6,152,490 A * | 11/2000 | Suzuki et al. ............... 280/801.1 |
| 6,237,981 B1 | 5/2001 | Selleck |
| 6,416,104 B1 | 7/2002 | Fisher et al. |

(Continued)

OTHER PUBLICATIONS

U.S. Appl. No. 12/685,877. Titled: Vehicle Having Utility Bed and Locking Device, filed: Jan. 12, 2010, Inventor: David W Arnold, in its entirety.

(Continued)

*Primary Examiner* — Paul N Dickson
*Assistant Examiner* — Joselynn Y Sliteris
(74) *Attorney, Agent, or Firm* — Ulmer & Berne LLP

(57) ABSTRACT

A vehicle includes a vehicular frame, a utility bed, and a passenger restraint assembly. The utility bed is coupled with the vehicular frame and includes a bed floor, a side wall, and a rear seat. The passenger restraint assembly includes a securing member, a belt and a retractor. The securing member is coupled with the utility bed adjacent to the rear seat. The belt includes a first end; a second end, and a securing portion. The securing portion is configured for selective engagement with the securing member. The retractor is coupled with the side wall. The retractor includes a carrier that is coupled with the first end of the belt and is configured to facilitate selective dispensation of the belt.

18 Claims, 11 Drawing Sheets

U.S. PATENT DOCUMENTS

| | | | |
|---|---|---|---|
| 6,481,772 B1 | 11/2002 | Tenn | |
| 6,488,326 B2 * | 12/2002 | Wyszogrod et al. | 296/64 |
| 6,517,135 B2 | 2/2003 | de Gaillard | |
| 6,557,882 B2 | 5/2003 | Harrington | |
| 6,644,709 B2 | 11/2003 | Inagaki et al. | |
| D498,435 S | 11/2004 | Saito et al. | |
| 6,994,388 B2 | 2/2006 | Saito et al. | |
| 7,159,922 B2 | 1/2007 | Iyoda et al. | |
| 7,364,200 B2 * | 4/2008 | Downey | 280/801.1 |
| 7,416,238 B2 | 8/2008 | Houston | |
| 7,735,896 B2 | 6/2010 | Kubota | |
| 7,762,621 B2 * | 7/2010 | Duller | 296/190.11 |
| 7,841,639 B2 * | 11/2010 | Tanaka et al. | 296/65.05 |
| 8,002,331 B2 * | 8/2011 | Bowers | 296/183.2 |
| 8,075,040 B2 * | 12/2011 | Arnold | 296/69 |
| 8,087,694 B2 * | 1/2012 | Johnson et al. | 280/756 |
| 2004/0041430 A1 | 3/2004 | Harvey | |
| 2005/0140129 A1 * | 6/2005 | Miki et al. | 280/756 |
| 2005/0264048 A1 | 12/2005 | Collins | |
| 2008/0309112 A1 | 12/2008 | Duller | |
| 2009/0256388 A1 | 10/2009 | Tanaka et al. | |
| 2011/0169289 A1 * | 7/2011 | Arnold et al. | 296/10 |
| 2011/0187178 A1 * | 8/2011 | King | 298/17 R |
| 2011/0221177 A1 * | 9/2011 | Srabstein | 280/756 |

OTHER PUBLICATIONS

U.S. Appl. No. 12/477,717, Titled: Vehicle Having Utility Bed and Seat, Filed: Jun. 3, 2009, Inventor: David W. Arnold, in its entirety.

Darin D. King, Notice of Allowance and Fee(s) Due, issued in U.S. Appl. No. 13/017,565, dated Nov. 5, 2012, 29 pages in its entirety.

* cited by examiner

VEHICLE HAVING UTILITY BED AND PASSENGER RESTRAINT ASSEMBLY

TECHNICAL FIELD

A vehicle includes a utility bed. The utility bed includes a rear seat and a passenger restraint assembly associated with the rear seat.

BACKGROUND

Certain conventional vehicles include a utility bed which is movable between a hauling position and a dumping position. Such a utility bed is often referred to as a "dump bed" and is suitable to facilitate transportation of cargo.

SUMMARY

In accordance with one embodiment, a vehicle comprises a vehicular frame, a utility bed, and a passenger restraint assembly. The utility bed is pivotally coupled with the vehicular frame and is pivotable between a hauling position and a dumping position. The utility bed comprises a bed floor, a side wall, and a rear seat. The passenger restraint assembly comprises a securing member, a belt, and a retractor. The securing member is coupled with the utility bed adjacent to the rear seat. The belt comprises a first end, a second end, and a securing portion. The securing portion is configured for selective engagement with the securing member. The retractor is coupled with the side wall. The retractor comprises a carrier that is coupled with the first end of the belt and is configured to facilitate selective dispensation of the belt.

In accordance with another embodiment, a utility vehicle comprises a vehicular frame, a utility bed, a rear roll bar assembly, and a passenger restraint assembly. The utility bed is coupled with the vehicular frame. The utility bed comprises a bed floor, a side wall, a front wall, and a rear seat. The rear roll bar assembly is coupled with at least one of the vehicular frame and the utility bed. The rear roll bar assembly is configured to provide overlying protection for the rear seat. The passenger restraint assembly comprises a securing member, a belt, a retractor and a hanger member. The securing member is coupled with the utility bed adjacent to the rear seat. The belt comprises a first end, a second end, and a securing portion. The securing portion is configured for selective engagement with the securing member. The retractor is coupled with the side wall. The retractor comprises a carrier that is coupled with the first end of the belt and is configured to facilitate selective dispensation of the belt. The hanger member is coupled with the rear roll bar assembly and is configured to support the belt adjacent to the rear roll bar assembly.

In accordance with yet another embodiment, a vehicle comprises a vehicular frame, a utility bed, a rear roll bar assembly, a left passenger restraint assembly, a right passenger restraint assembly, a left hanger member, and a right hanger member. The utility bed is pivotally coupled with the vehicular frame and is pivotable between a hauling position and a dumping position. The utility bed comprises a bed frame, a bed floor, a front wall, a left side wall, a right side wall, a left seat back, a right seat back, a left seat bottom, and a right seat bottom. The bed floor comprises a rear floor and a front floor. The rear floor is coupled with the bed frame. The front floor is pivotally coupled with the rear floor and is pivotable between an upright position and a cargo support position. The front wall is pivotally coupled with the bed frame and is pivotable between an erected position and a collapsed position. The left side wall comprises a left door that is pivotable between an opened position and a closed position. The right side wall comprises a right door that is pivotable between an opened position and a closed position. The left seat back is coupled with the front floor. The right seat back is coupled with the front floor. The left seat bottom is coupled with the front wall. The right seat bottom is coupled with the front wall. The rear roll bar assembly is coupled with the bed frame and comprises a left roll bar member and a right roll bar member. The left passenger restraint assembly comprises a left securing member, a first belt, and a first retractor. The left securing member is coupled with the front wall adjacent the left seat bottom. The first belt comprises a first end, a second end, and a first securing portion. The first securing portion is configured for selective engagement with the left securing member. The first retractor is coupled with the left side wall. The first retractor comprises a first carrier coupled with the first end of the first belt. The first carrier is configured to facilitate selective dispensation of the first belt. The right passenger restraint assembly comprises a right securing member, a second belt, and a second retractor. The right securing member is coupled with the front wall adjacent the right seat bottom. The second belt comprises a third end, a fourth end, and a second securing portion. The second securing portion is configured for selective engagement with the right securing member. The second retractor is coupled with the right side wall. The second retractor comprises a second carrier coupled with the third end of the second belt. The second retractor is configured to facilitate selective dispensation of the second belt. The left hanger member is coupled with the left roll bar member and is configured to support the first belt adjacent to the left roll bar member. The right hanger member is coupled with the right roll bar member and is configured to support the second belt adjacent to the right roll bar member. When the front floor is in the upright position with the front wall in the collapsed position, the left seat back and the left seat bottom cooperate to provide a left rear seat and the right seat back and the right seat bottom cooperate to provide a right rear seat.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION

Figure 1:
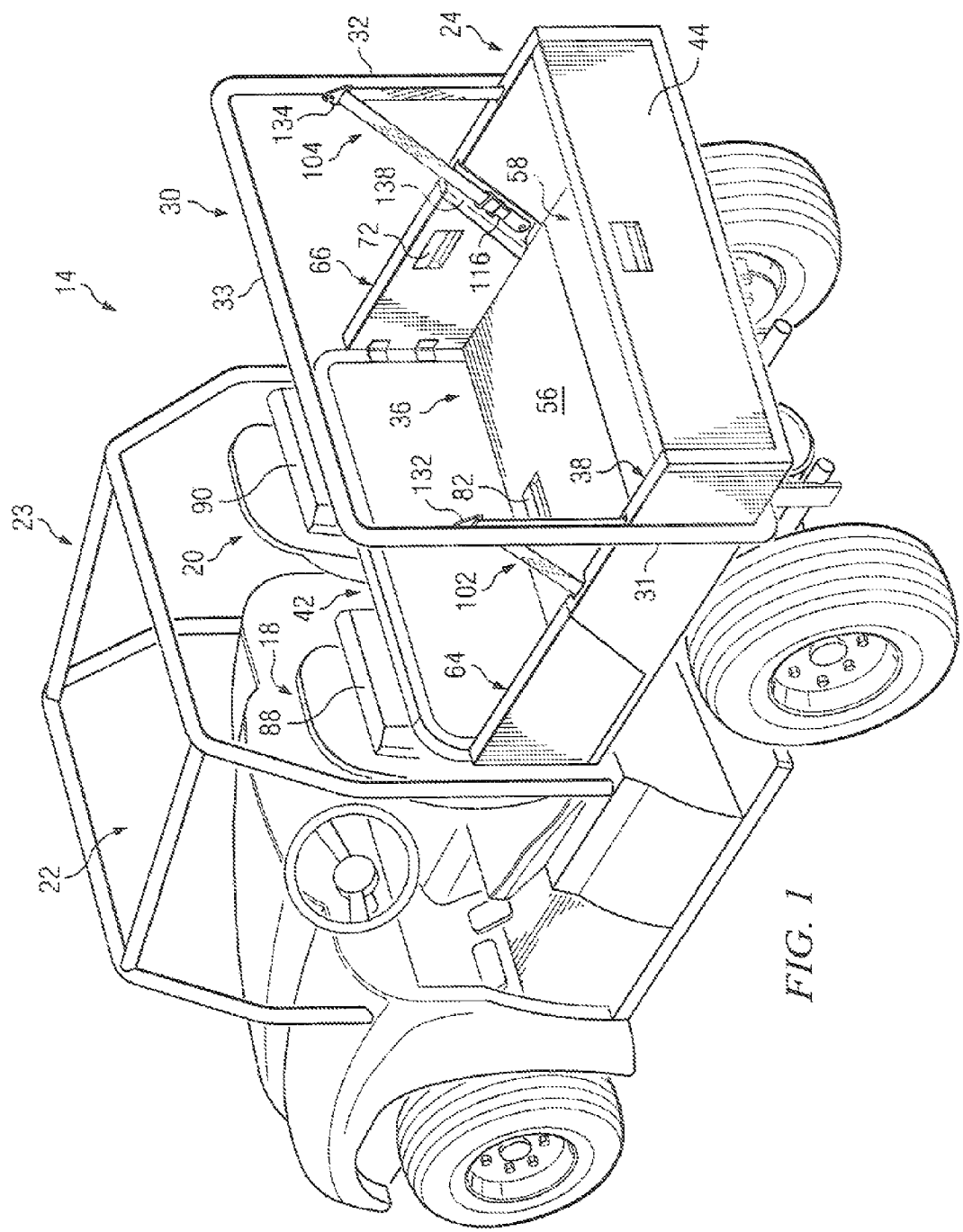
FIG. 1 is a left rear perspective view depicting a vehicle in accordance with one embodiment.

Embodiments are hereinafter described in detail in connection with the views of FIGS. 1-11. A vehicle includes a utility bed which can be used to facilitate hauling of cargo by the vehicle. In one embodiment, the vehicle can be a dump-type vehicle having a utility bed that can facilitate selective dumping of cargo from the utility bed. A dump-type vehicle can comprise a light utility vehicle, such as the utility vehicle 14 shown in FIGS. 1-11. In other embodiments, a dump-type vehicle can comprise any of a variety of other types of vehicles having a utility bed that is capable of dumping (e.g., a dump bed) such as, for example, a pickup truck, a dump truck, an all terrain vehicle ("ATV"), and a golf cart, for example, in another embodiment the vehicle can include a non-dump type vehicle having a utility bed that is rigidly affixed to the vehicle's frame (e.g. a non-dumpable bed). In yet another embodiment, the vehicle can include a trailer.

Referring again to FIGS. 1-11, the utility vehicle 14 can include a vehicular frame 16. The vehicular frame 16 can include any of a variety of structural and/or decorative rails, panels, and/or other components which are typically, although not necessarily, formed from metal (e.g., steel and/or aluminum). A left front seat 18 and a right front scat 20 can each be supported by the vehicular frame 16 and can facilitate support of occupants within a passenger compartment 22 that is defined by a front roll bar assembly 23. The utility vehicle 14 can also include a utility bed 24 which can be coupled with the vehicular frame 16, either directly or indirectly, and such as through use of a hinge assembly 26 shown in FIG. 2. The hinge assembly 26 can facilitate pivotable movement of the utility bed 24 with respect to the vehicular frame 16 of the utility vehicle 14 between a hauling position (shown in FIGS. 1 and 3) and a dumping position (shown in FIG. 2). When the utility bed 24 is in the hauling position, the utility bed 24 can rest upon a rest surface 27 (FIG. 2) provided by a rest structure 28 which is attached to the vehicular frame 16 of the utility vehicle 14. In one embodiment, the rest structure 28 can comprise a rigid structure (e.g., formed from sheet metal), though in another embodiment, a rest structure can comprise a resilient element (e.g., a rubber bumper).

Referring again to FIGS. 1-11, the utility vehicle 14 can include a roll bar assembly 30 that includes a left roll bar member 31, a right roll bar member 32, and an upper roll bar member 33. The left and right roll bar members 31, 32 can extend generally upwardly from a location adjacent to the utility bed 24. The upper roll bar member 33 can extend laterally between the left and right roll bar members 31, 32 such that the roll bar assembly 30 in is an inverted U-shape. The left and right roll bar members 31, 32 are shown attached to the utility bed 24 (e.g., to respective left and right portions of a bed frame 46) adjacent to the hinge assembly 26. In such an arrangement, the roll bar assembly 30 can provide overlying protection for passengers seated in rear seats. In such an arrangement, the roll bar assembly 30 can move with the utility bed 24 when the utility bed 24 is moved between the hauling and dumping positions. However, a rear roll bar assembly can be coupled with at least one of the vehicular frame and the utility bed in any of a variety of suitable alternative arrangements. For example, a roll bar assembly can be attached directly to the vehicular frame 16 such that movement of the utility bed 24 between the hauling and dumping positions does not correspondingly move the roll bar assembly. The front and rear roll bar assemblies 23, 30 are shown in FIGS. 1-11 to be formed from tubular members which, in one example, are formed from metal (e.g. steel). However, a roll bar assembly can be additionally or alternatively formed from any of a variety of suitable alternative components and/or materials.

Figure 2:
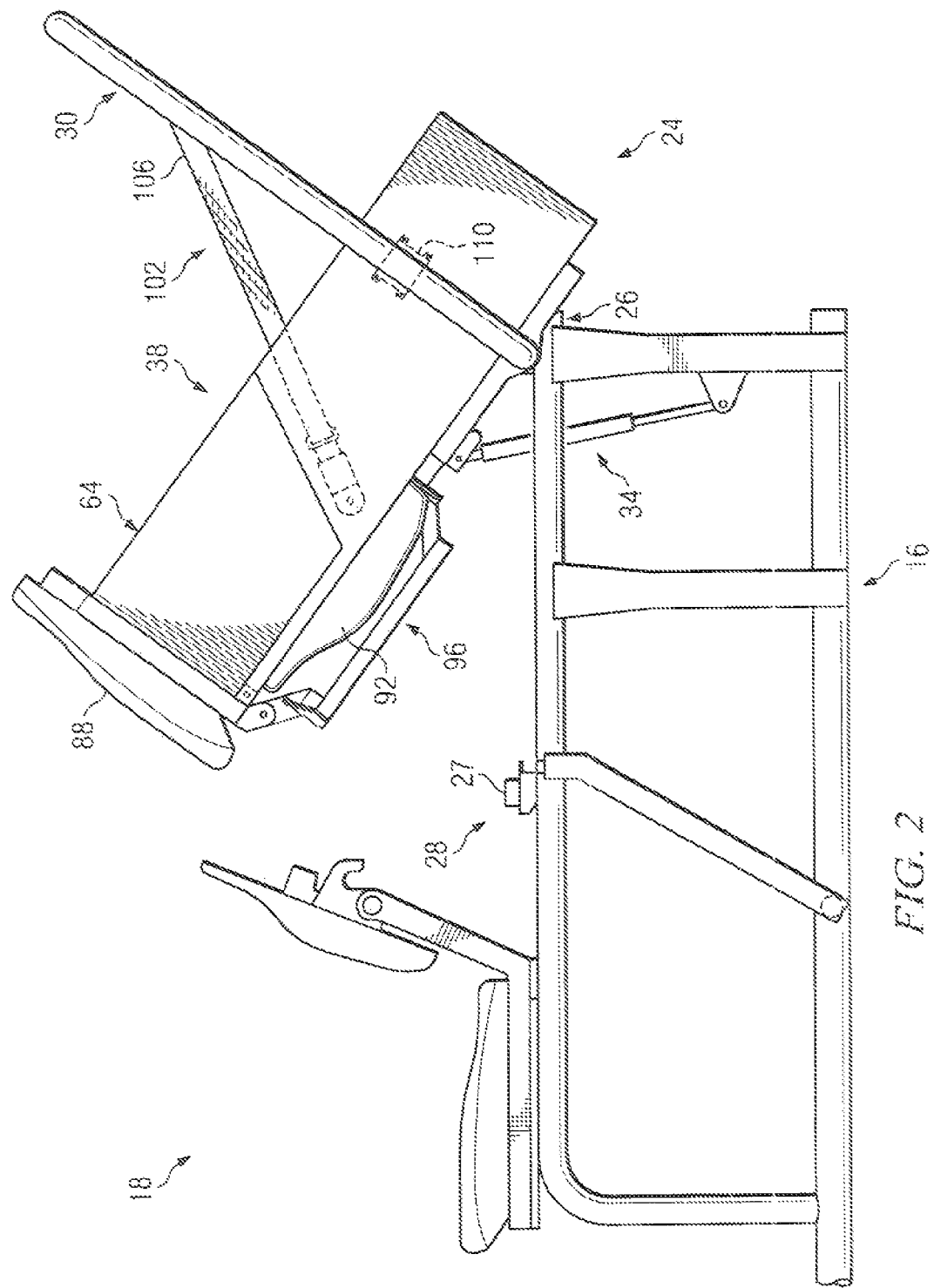
FIG. 2 is a left side elevational view depicting a utility bed and various other components of the vehicle of FIG. 1, wherein the utility bed is shown in a dumping position.

The utility vehicle 14 can include an actuator 34 coupled with the vehicular frame 16 and the utility bed 24. The actuator 34 can be configured to facilitate movement of the utility bed 24 between the hauling position and the dumping position. In one embodiment, the actuator 34 can comprise an electric linear actuator, as illustrated in FIG. 2. It will be appreciated that any of a variety of known conventional mechanisms or methods can be provided to facilitate manual or powered movement of the utility bed 24 between the hauling and dumping positions under control of an operator of the utility vehicle 14.

In the embodiment of FIGS. 1-11, the utility bed 24 is shown to comprise a bed floor 36. The utility bed 24 is also shown to include a left side wall 38 and a right side wall 40 each extending generally perpendicularly from the bed floor 36 or locations adjacent to the bed floor 36. The utility bed 24 can also include end walls such as a front wall 42 and a tailgate 44, as illustrated in FIGS. 1-3 and 5-8. The tailgate 44 can be pivotally coupled with respect to the bed floor 36. When the utility bed 24 is in the hauling position (shown in FIGS. 1 and 3), it will be appreciated that the left side wall 38, the right side wall 40, and the front wall 42 can cooperate with the bed floor 36 to retain cargo within the utility bed 24. The tailgate 44, when closed (as shown in FIGS. 1-3 and 5-6), can also cooperate with the left side wall 38, the right side wall 40, and the bed floor 36 to retain cargo within the utility bed 24. It will be appreciated that the tailgate 44 can be selectively opened to facilitate loading of the utility bed 24 and/or to allow cargo (e.g., dirt) to pour from the utility bed 24 when the utility bed 24 is in a dumping position (shown in FIG. 2). In another embodiment, it will be appreciated that a rear wall can be provided in lieu of a tailgate with the rear wall being rigidly affixed with respect to a bed floor of a utility bed such that it might not be capable of being selectively opened by an operator. In yet another alternative embodiment, it will be appreciated that a utility bed might not include any tailgate and/or side walls and might, for example, comprise a flat-bed type configuration (e.g., commonly used for hauling small vehicles).

Figure 4:
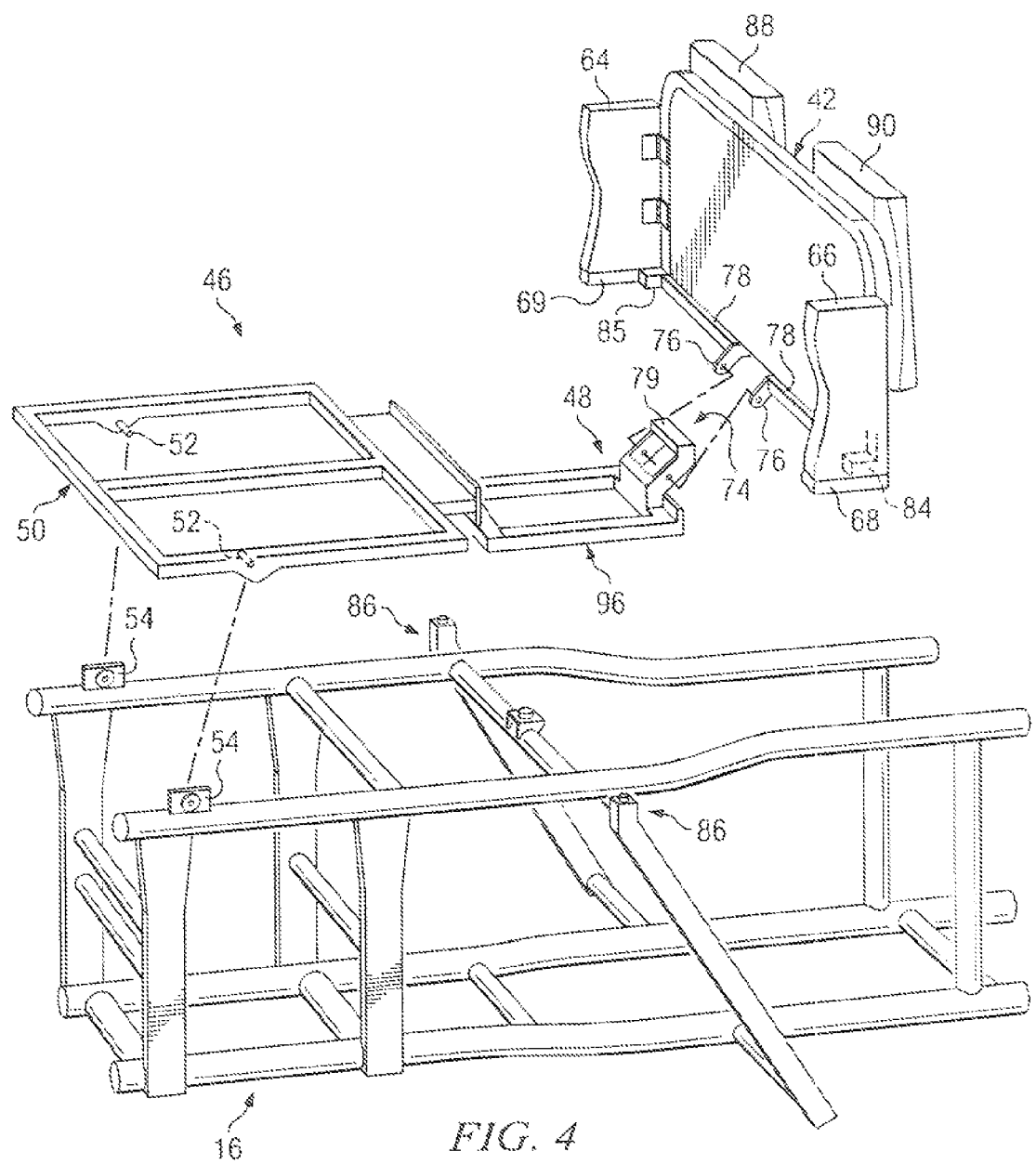
FIG. 4 is an exploded view of the front wall, a bed frame, a vehicular frame, and various other components of the vehicle of FIG. 1.
Figure 5:
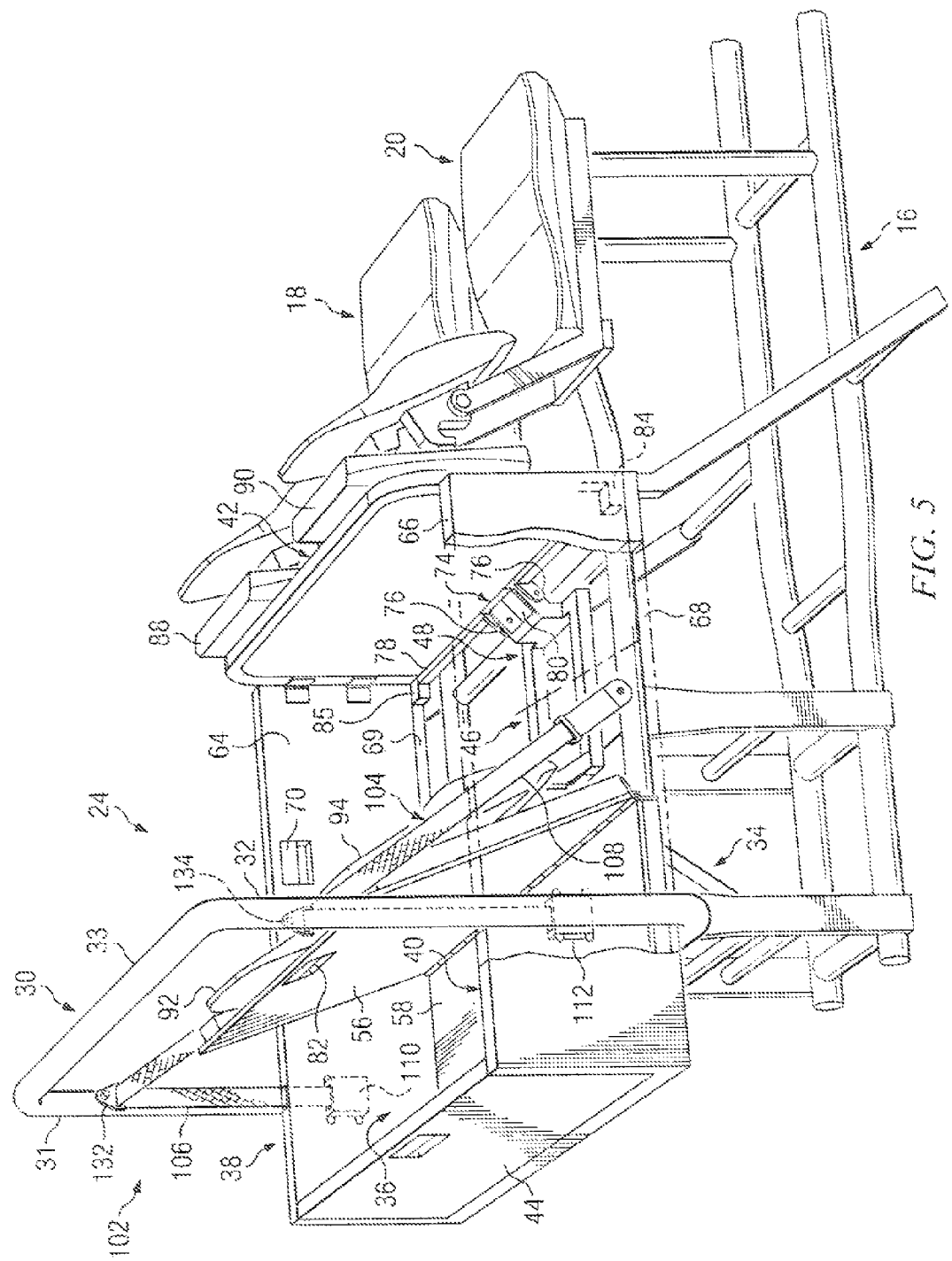
FIG. 5 is a right rear perspective view similar to FIG. 3 but with the front floor of the utility bed in an upright position.

In one embodiment, the bed frame 46 can be configured to provide underlying and structural support for certain components of the utility bed 24. As illustrated in FIG. 4, the bed frame 46 can comprise a tubular frame structure that extends along a length of the bed floor 36 and underneath the bed floor 36, as illustrated in FIGS. 4 and 5, to provide underlying support for the bed floor 36, the left and right side walls 38, 40, and/or the front wall 42. The bed frame 46 can include a front portion 48 and a rear portion 50. The rear portion 50 of the bed frame 46 can include pins 52 of the hinge assembly 26. The pins 52 can be journalled (e.g., with hearings) within corresponding brackets 54 of the hinge assembly 26 to facilitate pivoting of the utility bed 24 relative to the vehicular frame 16. It will be appreciated that a bed frame can be provided in any of a variety of suitable alternative arrangements. For example, a bed frame might be integrally formed as part of a bed floor such as in a one-piece bed floor/bed frame configuration.

Figure 3:
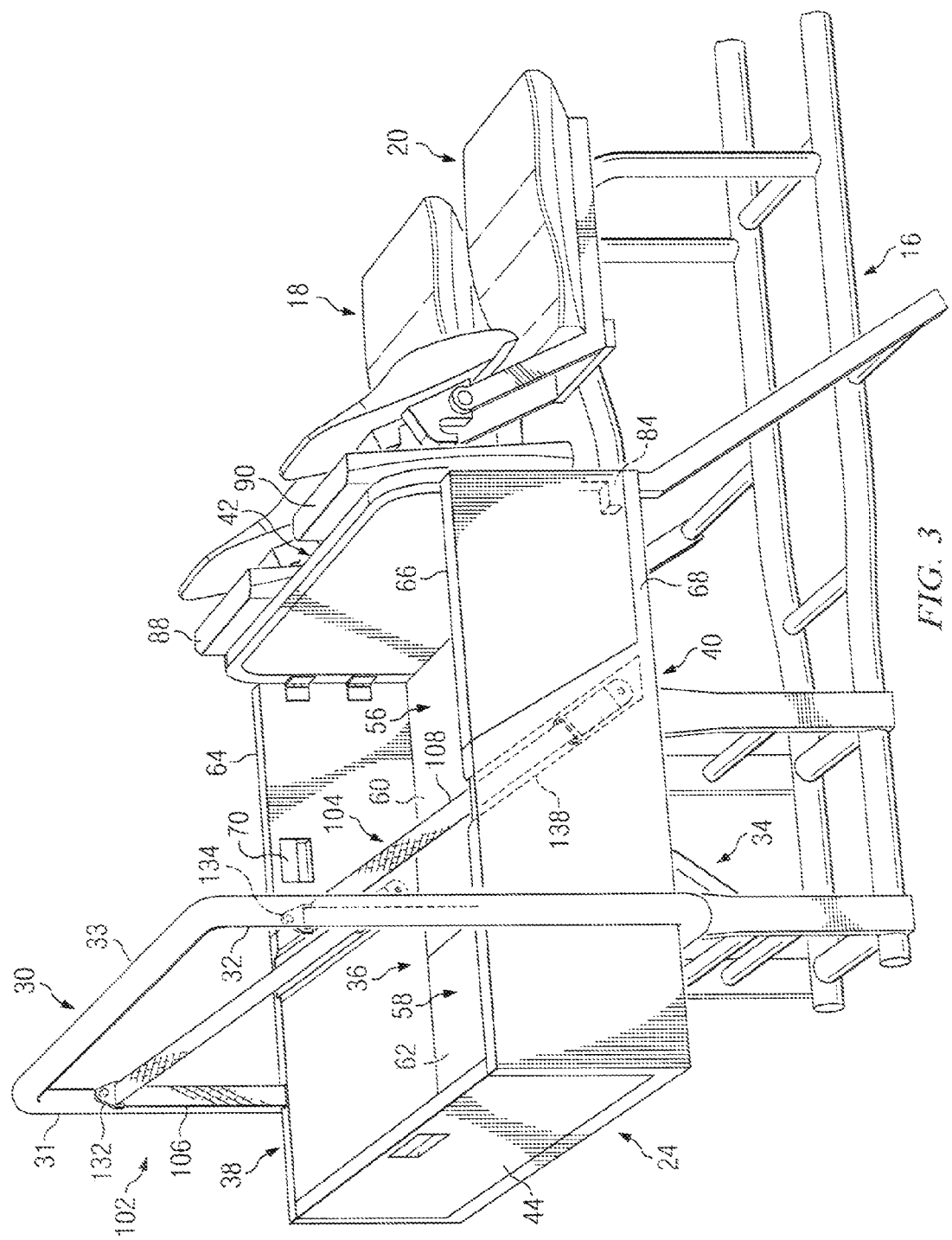
FIG. 3 is a right rear perspective view depicting the utility bed, left and right passenger restraint assemblies, and various other components of the vehicle of FIG. 1, wherein the utility bed is shown in a hauling position with a front floor in a cargo support position, left and right doors in closed positions, and a front wall in an upright position.

The bed floor 36 is shown to comprise a front floor 56 and a rear floor 58. As illustrated in FIGS. 3 and 5, the front floor 56 can be pivotable with respect to the rear floor 58 between a cargo support position (FIG. 3) and an upright position (FIG. 5). The front floor 56 can define a front cargo support surface 60 and the rear floor 58 can define a rear cargo support surface 62. When the front floor 56 is in the cargo support position, the front cargo support surface 60 and the rear cargo support surface 62 can cooperate to define a substantially coplanar support surface that is configured to directly contact and provide underlying support for cargo (not shown) disposed within the utility bed 24. In an alternative embodiment, the bed floor 36 might not include a rear floor. It will be appreciated that first and second floor portions of a bed floor can be provided in any of a variety of suitable alternative arrangements.

The front floor 56 is shown to be pivotally attached to the rear floor 58 to facilitate pivoting of the front floor 56 between the cargo support position and the upright position. In other embodiments, it will be appreciated that a front floor can be movably coupled with a bed frame in any of a variety of suitable alternative arrangements. For example, a front floor can be pivotally attached directly to a bed frame.

In one embodiment, the rear floor 58 can be fixed with respect to the bed frame 46 such as through welded attachment. However, in other embodiments, the rear floor 58 can be pivotally or otherwise movably attached to the bed frame 46. For example, the rear floor 58 can be pivotally attached to the bed frame 46 to facilitate selective access to the area underlying the utility bed 24 (e.g., facilitating access to the hinge assembly 26).

It will be appreciated that any of a variety of known conventional mechanisms or methods (none shown) can be provided to facilitate manual or powered movement of the front floor 56 between the cargo support position and the upright position. For example, the front floor 56 can include a selectively concealable handle (not shown). In another embodiment, an electronic linear actuator can be coupled with each of the front floor 56 and the bed frame 46.

Figure 6:
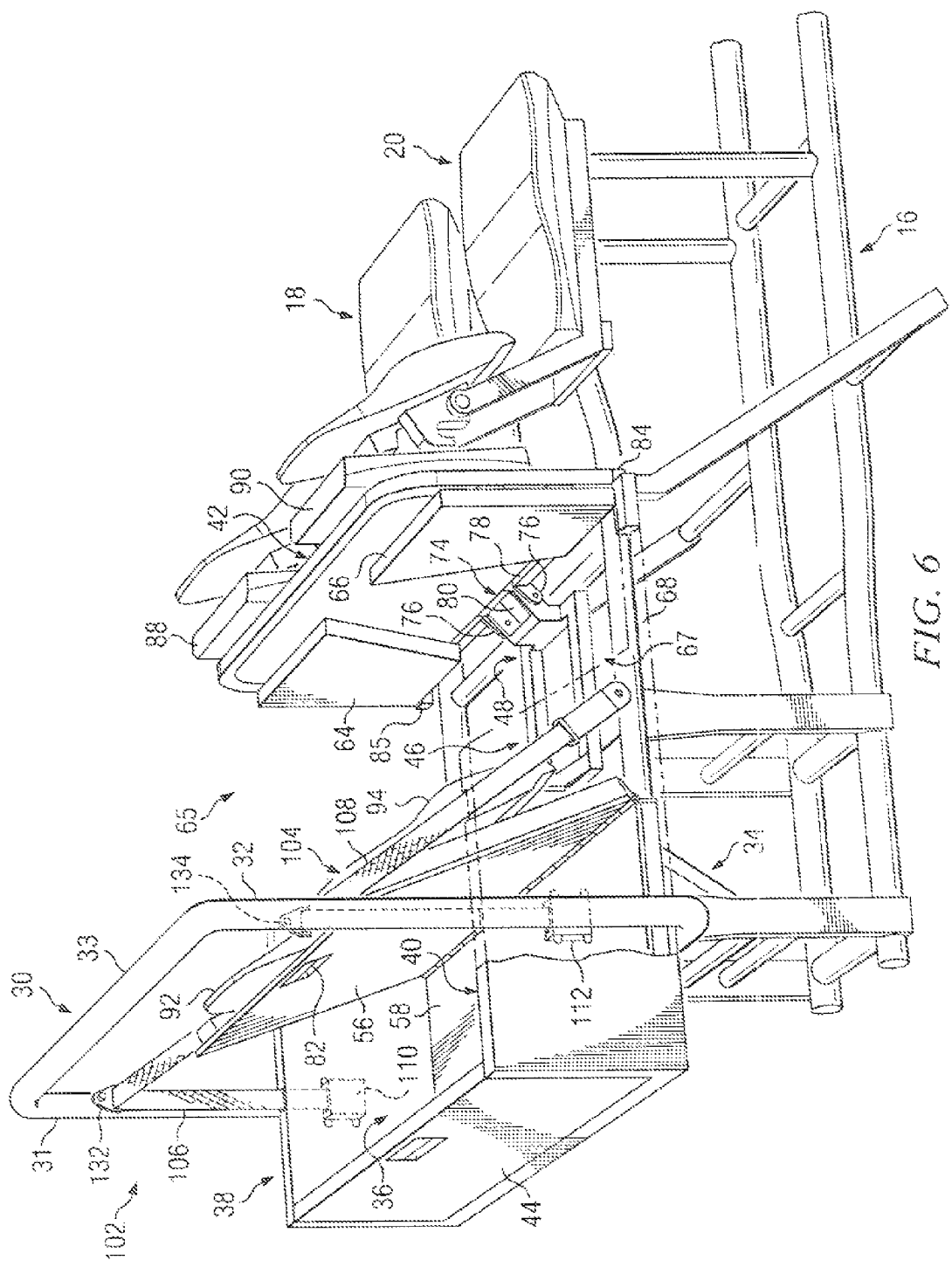
FIG. 6 is a right rear perspective view similar to FIG. 5 but with the left and right doors in opened positions.

The left and right side walls 38, 40 are shown to include respective left and right doors 64, 66 which are each pivotable between a closed position (FIG. 3) and an opened position (FIG. 6). When in the closed position, each of the left and right doors 64, 66 can cooperate with the bed floor 36, the front wall 42, and the remaining portions of the left and right side walls 38, 40 to retain cargo within the utility bed 24. When the left and right doors 64, 66 are moved to the opened position, left and right openings 65, 67 can be defined.

The left and right doors 64, 66 are shown to be pivotally attached to the front wall 42 such that, when the left and right doors 64, 66 are in the opened position, they can each lie substantially parallel with and against the front wall 42. In another embodiment, left and right doors can be pivotally attached to adjacent portions of respective left and right side walls. In such an embodiment, when the left door is in the opened position, it can lie substantially parallel with and against the left side wall. When the right door is in the opened position, it can lie substantially parallel with and against the right side wall.

The left and right side walls 38, 40 can be configured to ensure that the left and right doors 64, 66 can move to the opened position without being obstructed and while still maintaining proper aesthetics when the left and right doors 64, 66 are in their closed positions. As illustrated in FIGS. 3 and 5-6, the right side wall 40 can define a lower horizontally extending portion 68. When the right door 66 is in the closed position, the lower horizontally extending portion 68 can cooperate with the right door 66 to give the appearance of a substantially continuous right side wall 40. However, when the right door 66 is moved to the opened position, the lower horizontally extending portion 68 can remain in a fixed position thereby allowing the right door 66 to move to the opened position without being obstructed by the bed frame 46 and/or the bed floor 36. As illustrated in FIG. 2, the left side wall 38 and kit door 64 can also include a lower horizontally extending portion (e.g. 69) that interacts with the left door 64 in a similar manner as shown and described with respect to the interaction between the lower horizontally extending portion 68 and the right door 66.

In one embodiment, a seal can be provided along the perimeter of each of the left and right doors 64, 66. Each seal can facilitate selective sealing of the interaction between the door (e.g., 64, 66), the adjacent side wall (e.g., 38, 40), and the lower horizontally extending portion (e.g., 68, 69). In another embodiment, the left and right door 64, 66 can each include a manually operated latching mechanism (e.g., 70, 72) that facilitates selective securing of the respective door (e.g., 64, 66) in their closed positions. In yet another embodiment, an attachment assembly (not shown) can be provided that selectively maintains the left and right doors 64, 66 in the opened position. For example, in the embodiment of FIGS. 1-11, an attachment assembly can be provided that selectively maintains the left and right doors 64, 66 against the front wall 42.

Figure 7:
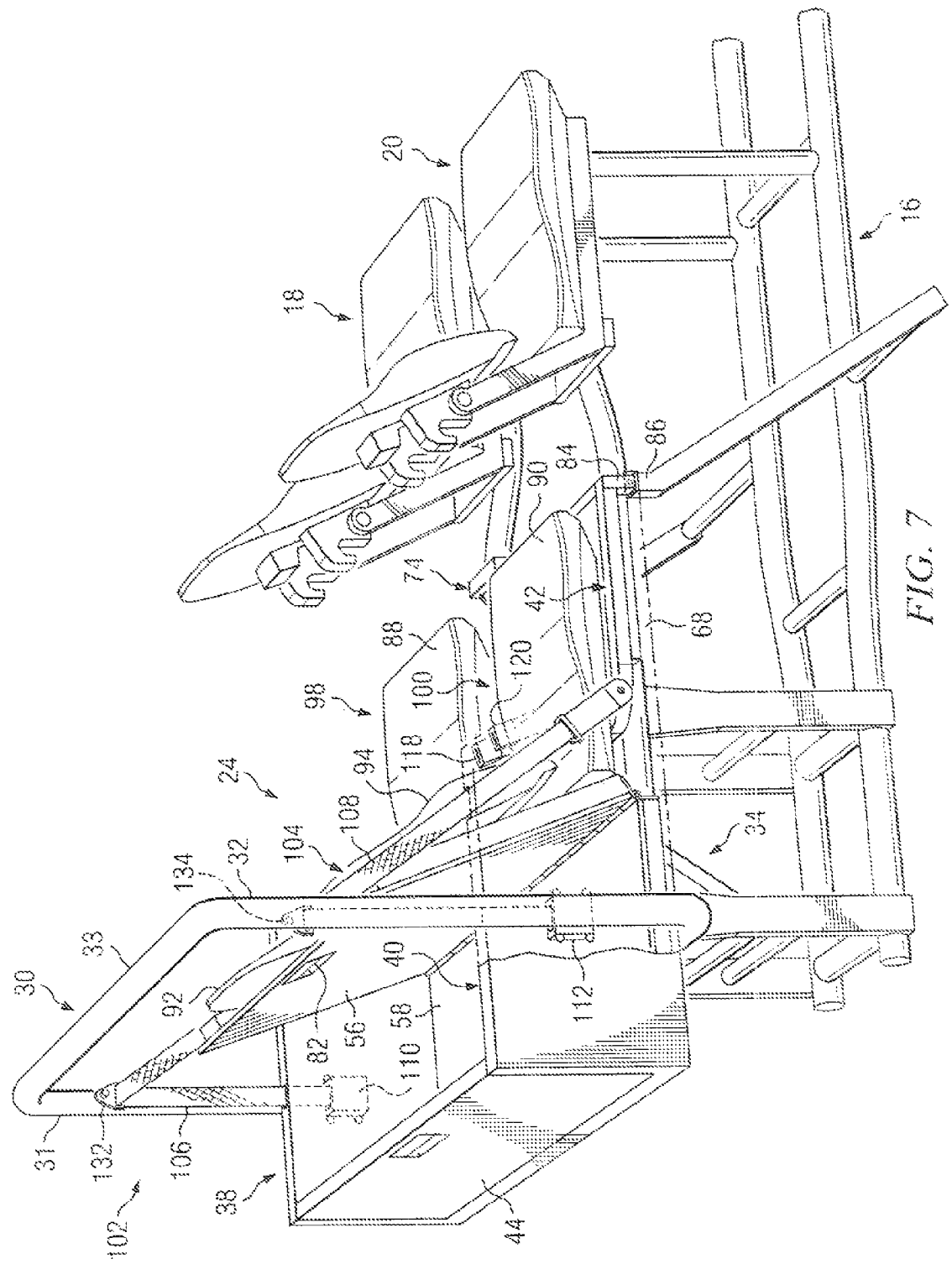
FIG. 7 is a right rear perspective view similar to FIG. 6 but with the front wall in a collapsed position to provide a left rear seat and a right rear seat.

As illustrated in FIGS. 5-7, the front wall 42 can be pivotable between an erected position (FIGS. 5 and 6) and a collapsed position (FIG. 7). When the front wall 42 is in the erected position, the front wall 42 and the left and right side walls 38, 40 car cooperate with the bed floor 36 to retain cargo within the utility bed 24.

In one embodiment, the front wall 42 can be pivotally attached to the bed frame 46 to facilitate pivoting of the front wall 42 between the erected position and the collapsed position. As illustrated in FIGS. 4-6, the bed frame 42 can include a neck portion 74 that extends from the front portion 48 of the bed frame 46. The front wall 42 can include a pair of hinge arms 76 that can be pivotally coupled with the neck portion 74. The hinge arms 76 can be pivotally attached to the neck portion 74 (e.g., with pins). In one embodiment, as illustrated in FIG. 4, the hinge arms 76 can be attached (e.g., through welding) to a bottom edge of the front wall 42 and to adjacent flange members 78 that are also attached to the bottom edge of the front wall 42. In such an arrangement, the neck portion 74 can rest upon the rest surface 27 (FIG. 2) provided by the rest structure 28 when the utility bed 24 is in the hauling position.

It will be appreciated that a front wall can be pivotally coupled or otherwise movably coupled with a bed frame in any of a variety of suitable alternative arrangements. For example, a front wall can be pivotally attached to the vehicular frame 16 such that pivoting the utility bed 24 to the dumping position does not correspondingly move the front wall. In another example, a front wall can be movably secured to a bed frame through the use of tracks such that the front wall can slide with respect to the bed frame (e.g., between the erected and collapsed positions).

When the front wall 42 is in the erected position, as illustrated in FIGS. 5 and 6, the front wall 42 can rest upon an upper surface 79 (shown in FIG. 4) of the neck portion 74. However, when the front wall 42 is in the collapsed position, the front wall 42 can lie adjacent to the neck portion 74 such that the neck portion 74 extends slightly above the front wall 42 (as illustrated in FIG. 7). As illustrated in FIGS. 5 and 6, when the front wall 42 is in the erected position, the flange members 78 of the front wall 42 can support the front floor 56 when the front floor 56 is in the cargo support position. The neck portion 74 can additionally define a receptacle 80. The receptacle 80 can selectively receive a portion of a latch 82 (shown in FIGS. 1, 5 and 6) that facilitates selective securement of the front floor 56 in the cargo support position. Alternatively, the front floor 56 can be selectively secured to the bed frame 46 using any of a variety of other suitable releasable fasteners and/or mechanism(s).

The front wall 42 can be configured to ensure that movement between the erected and collapsed position is not obstructed by the left and right side walls 38, 40 (e.g., lower horizontally extending portions 68, 69) while still maintaining proper aesthetics when the front wall 42 is in the collapsed position. As illustrated in FIGS. 5 and 6, the front wall 42 can include lower support portions 84, 85 disposed along lower ends of the front wall 42. The lower support portions 84, 85 of the front wall 42 can be provided alongside the lower horizontal extending portions 68, 69. When the front wall 42 is in the erected position, the lower support portions 84, 85 of the front wall 42 can be concealed by the lower horizontal extending portions 68, 69 of the left and right side walls 38, 40. When the front wall 42 moves into the collapsed position, each lower support portion 84, 85 can protrude from beneath the lower horizontal extending portions 68, 69 of the left and right side walls 38, 40 and can engage a support member (e.g., 86) of the vehicular frame 16 to provide underlying support for the front wall 42.

A left seat bottom 88 and a right seat bottom 90 can be coupled (e.g., either directly or indirectly) with the front wall 42. A left seat back 92 and a right seat back 94 can be coupled (e.g., either directly or indirectly) with the front floor 56. As illustrated in FIGS. 1-3, when the front floor 56 is in the cargo support position with the front wall 42 in the erected position, the left and right seat backs 92, 94 can be concealed beneath the utility bed 24 and the left and right seat bottoms 88, 90 can be stowed behind the left and right front seats 18, 20. In such an arrangement, the front floor 56 and the rear floor 58 can cooperate to facilitate support of cargo by the utility bed 24. The bed frame 46 can include a cradle portion 96 that can selectively underlie the left and right seat backs 92, 94. When the front floor 56 is in the cargo support position, as illustrated in FIG. 2, the cradle portion 96 can protect the left and right seat backs 92, 94 from being contacted (e.g., by underlying debris) during operation of the utility vehicle 14.

The utility bed 24 can accordingly be converted into rear seats for the utility vehicle 14. As illustrated in FIG. 5, the front floor 56 can be moved to the upright position to reveal the left seat back 92 and the right seat back 94. As illustrated in FIG. 6, with the front floor 56 in the upright position, each left and right door 64, 66 can be moved to their opened positions to define the respective left and right openings 65, 67. As illustrated in FIG. 7, once the left and right doors 64, 66 are moved to their opened positions, the front wall 42 can be pivoted to the collapsed position to move the left and right seat bottoms 88, 90 into a substantially horizontal position thereby concealing the left and right doors 64, 66. In such an arrangement, the left and right seat backs 92, 94 can cooperate with the respective left and right seat bottoms 88, 90 to define a left rear seat 98 and a right rear seat 100. Additionally, the left and right openings 65, 67 that are defined by opening the left and right doors 64, 66 can facilitate the ingress/egress of a passenger to/from the left and right rear seats 98, 100.

While the relative movement of the front floor 56, the left and right doors 64, 66, and the front wall 42 is shown in FIGS. 1-3 and 5-7, to be sequential, a utility bed can alternatively be provided that allows the front floor 56, the left and right doors 64, 66, and/or the front wall 42 to be moved independent of one another. In one embodiment, the front floor 56, the left and right doors 64, 66, and/or the front wall 42 can be moved manually. In another embodiment, the front floor 56, the left and right doors 64, 66, and/or the front wall 42 can be moved automatically, such as by actuating a pushbutton. In such an embodiment, each of the front floor 56, the left and right doors 64, 66, and the front wall 42 can be moved with motorized actuators.

It will be appreciated, that although the embodiment of FIGS. 1-11 illustrates forward facing rear seats which are disposed towards a frontmost portion of the utility bed 24, rear seats can be provided on a utility bed in any of a variety of suitable alternative arrangements. In one embodiment, a rear floor of the utility bed can include left and right seat backs and can be pivotable between a cargo support position and an upright position. A rear wall of the utility bed can include left and right seat bottoms and can be pivotable between an erected position and a collapsed position. When the rear wall is pivoted to the collapsed position with the rear floor in the upright position the left and right seat backs respectively cooperate with the left and right seat bottoms to define rearwardly facing left and right rear seats. In such an embodiment, the left and right side walls may or may not include respective left and right side doors since the rear seats can be accessed from the rear of the utility vehicle.

It will also be appreciated, that although the end walls (e.g., front and rear walls) have been described as being pivotable, end walls can be movable in any of a variety of suitable alternative manners to selectively reveal a seat bottom. In one embodiment, a front wall can be removable from the utility bed to facilitate manual positioning of the front wall in the erected or collapsed position. It will also be appreciated that the floor portions, such as front and rear portions can be movable in any of a variety of suitable alternative manners.

Figure 8:
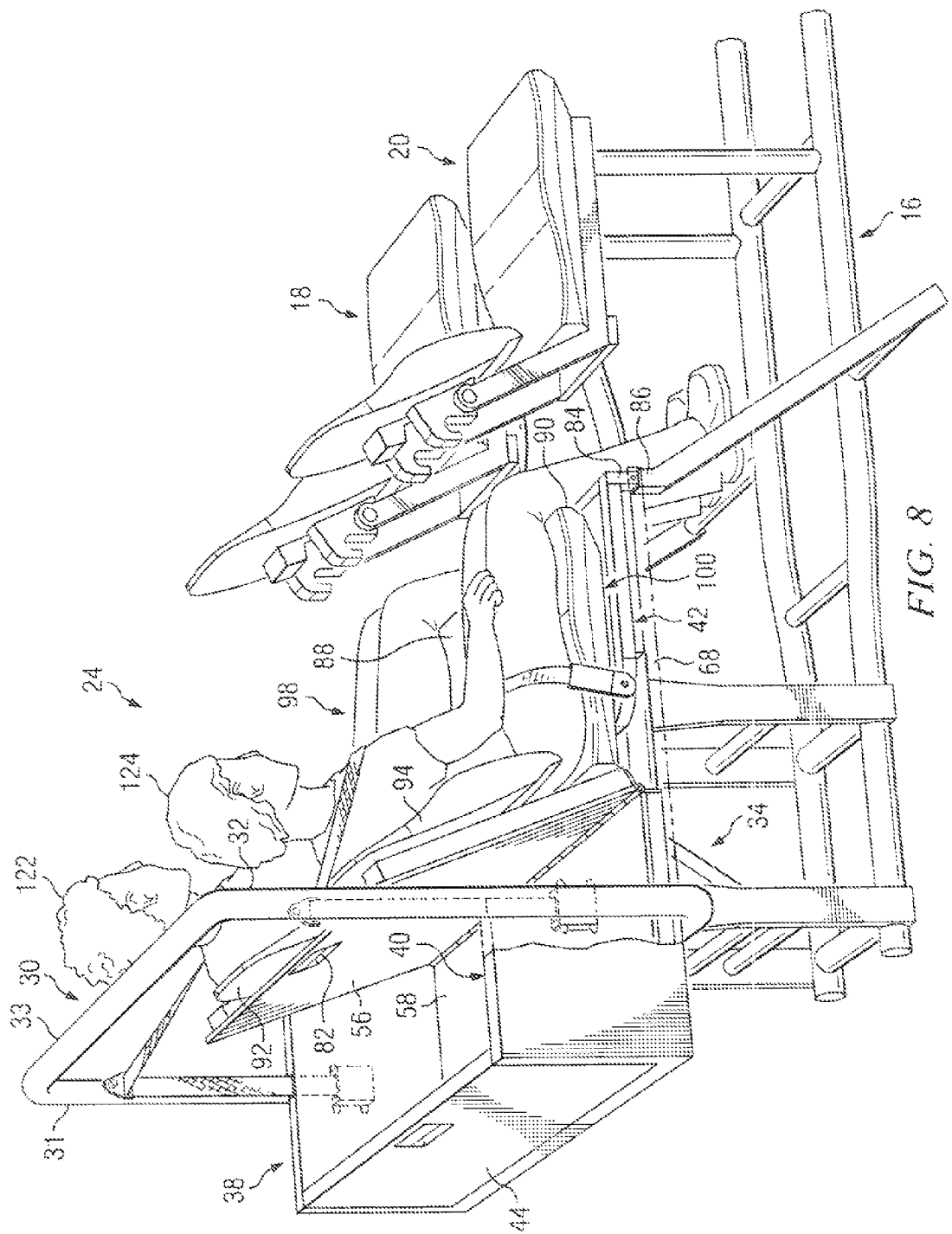
FIG. 8 is a right rear perspective view similar to FIG. 7 but with a passenger seated in each of the left and right rear seats and a belt routed over each respective passenger.
Figure 9:
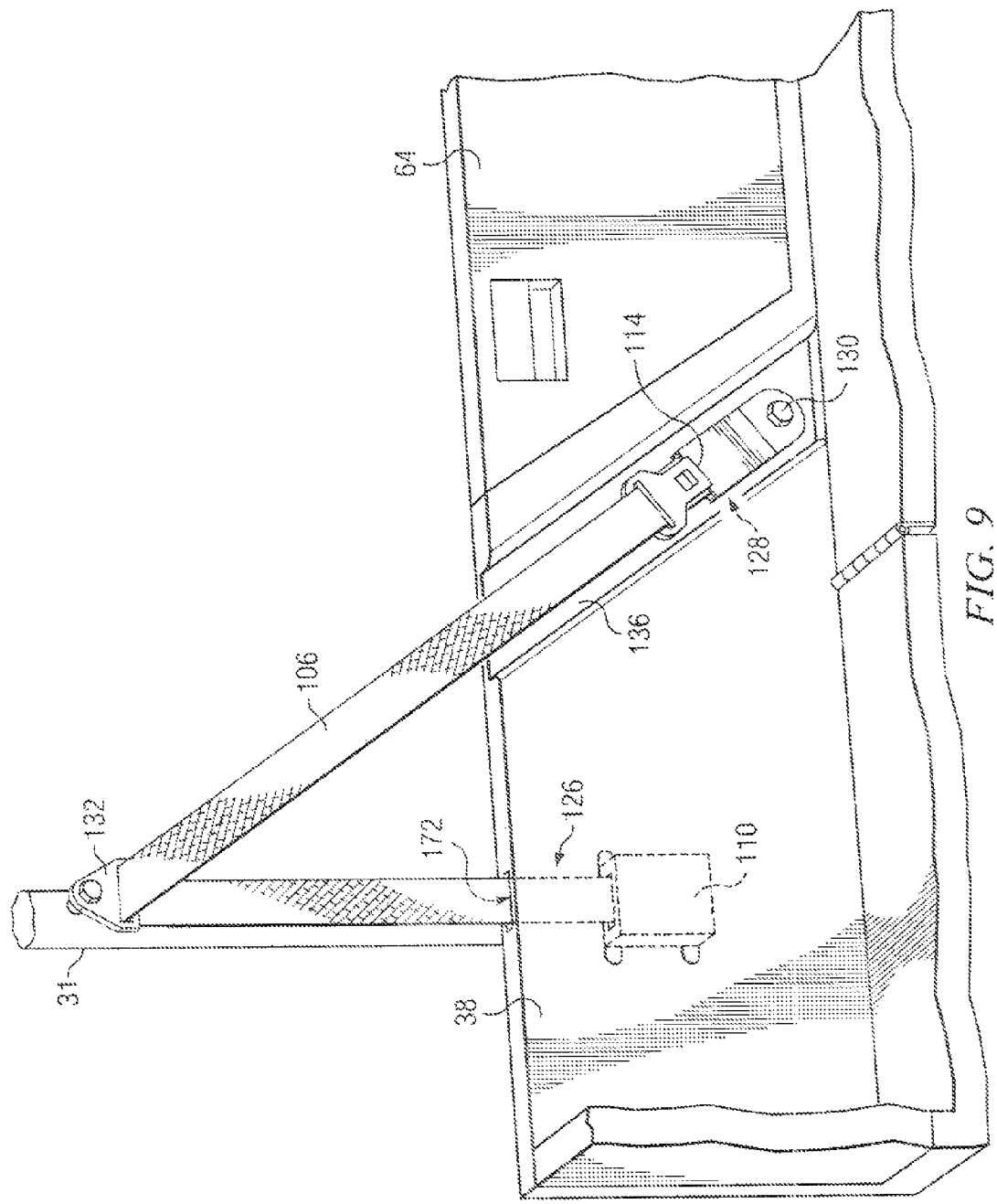
FIG. 9 is an enlarged right perspective view depicting the left side wall and certain portions of the left passenger restraint assembly.

Referring again to FIGS. 1-11, the utility vehicle 14 can include left and right passenger restraint assemblies 102, 104. The left passenger restraint assembly 102 can include a left belt 106, a left retractor 110, and a left securing portion 114, as illustrated in FIG. 9. The left securing portion 114 can be configured for selective engagement with a left securing member 118 (shown in FIG. 7) that is coupled with the front wall 42 adjacent to the left seat bottom 88. The left securing portion 114 can be configured to slide along the left belt 106 such that, when the left securing portion 114 is engaged with the left securing member 118, the left belt 106 is routed in a three-point harness configuration over a passenger 122 seated in the left rear seat 98 (e.g., with the belt 106 extending across the lap and over one shoulder of the passenger 122), as illustrated in FIG. 8. The right passenger restraint assembly 104 can include a right belt 108, a right retractor 112, and a right securing portion 116, as illustrated in FIGS. 1 and 5-7. The right securing portion 116 can be configured for selective engagement with a right securing member 120 (shown in FIG. 7) that is coupled with the front wall 42 adjacent to the right seat bottom 90. The right securing portion 116 can be configured to slide along the right belt 108 such that when the right securing portion 116 is engaged with the right securing member 120, the right belt 108 is routed in a three-point harness configuration over a passenger 124 seated in the right rear seat 100, as illustrated in FIG. 8.

In one embodiment, as illustrated in FIGS. 7 and 9, the left and right securing portions 114, 116 can comprise tongue members and the left and right securing members 118, 120 can include latches. Each tongue member can be releasably coupled with the latch in order to facilitate selective restraint of rear seated passengers (e.g., 122, 124). However, it will be appreciated that any of a variety of suitable alternative securing portions and/or securing members can be provided.

As illustrated in FIG. 9, the left belt 106 of the left passenger restraint assembly 102 can include a first end 126 and a second end 128. The first end 126 of the left belt 106 can be coupled with the left side wall 38 by the left retractor 110. The second end 128 of the left belt 106 can be coupled with the left side wall 38 by a bolt 130. A left hanger member 132 can be attached to the left roll bar member 31 at a location above the left side wall 38. The left belt 106 can be routed through the left hanger member 132, as shown in FIGS. 1-3 and 5-8, such that the left belt 106 is provided in a generally upside down "V" arrangement.

The right belt 108 can be arranged similar to the left belt 106 but along the right side wall 40. For example, respective ends of the right belt 108 can be coupled with the right side wall 40 by the right retractor 112 and a bolt, respectively. A right hanger member 134 (shown in FIG. 1) can be attached to the right roll bar member 32 at a location above the right side wall 40. The right belt 108 can be routed through the right hanger member 134, as shown in FIGS. 1-3 and 5-8, such that the right belt 108 is provided in a generally upside down "V" arrangement.

The left retractor 110 is shown in FIG. 9 to be arranged along the left side wall 38 adjacent the left roll bar member 31 such that the left belt 106 is routed to the left hanger member 132 alongside the left roll bar member 31. In this arrangement, the left roll bar member 31 can protect the portion of the left belt 106 that lies between the left side wall 38 and the left hanger member 132 from catching upon objects passing along the left side of the utility vehicle 14 during operation. The left side wall 38 is shown to define a left channel 136. The second end 128 of the left belt 106 can be secured to the left side wall 38 such that a portion of the left belt 106 lies within the left channel 136. This arrangement of the left belt 106 within the left channel 136 can protect the left belt 106 from catching upon cargo that is loaded into the utility bed 24. The right retractor 112 can be arranged similar to the left retractor 110 but along the right side wall 40. For example, the right retractor 112 can be arranged along the right side wall 40 adjacent the right roll bar member 32 such that the right belt 108 is routed to the right hanger member 134 and is accordingly protected from passing debris by the right roll bar member 32. A portion of the right belt 108 can lie within a right channel 138 (shown in FIG. 1) defined by the right side wall 40 and can accordingly be protected from cargo that is loaded into the utility bed 24. It will be appreciated that in an alternative embodiment, left and right channels 136, 138 can be enclosed by removable covers. In such an embodiment, each removable cover can be selectively removed to allow the associated belt (e.g., 106, 108) to be routed over a passenger.

Figure 10:
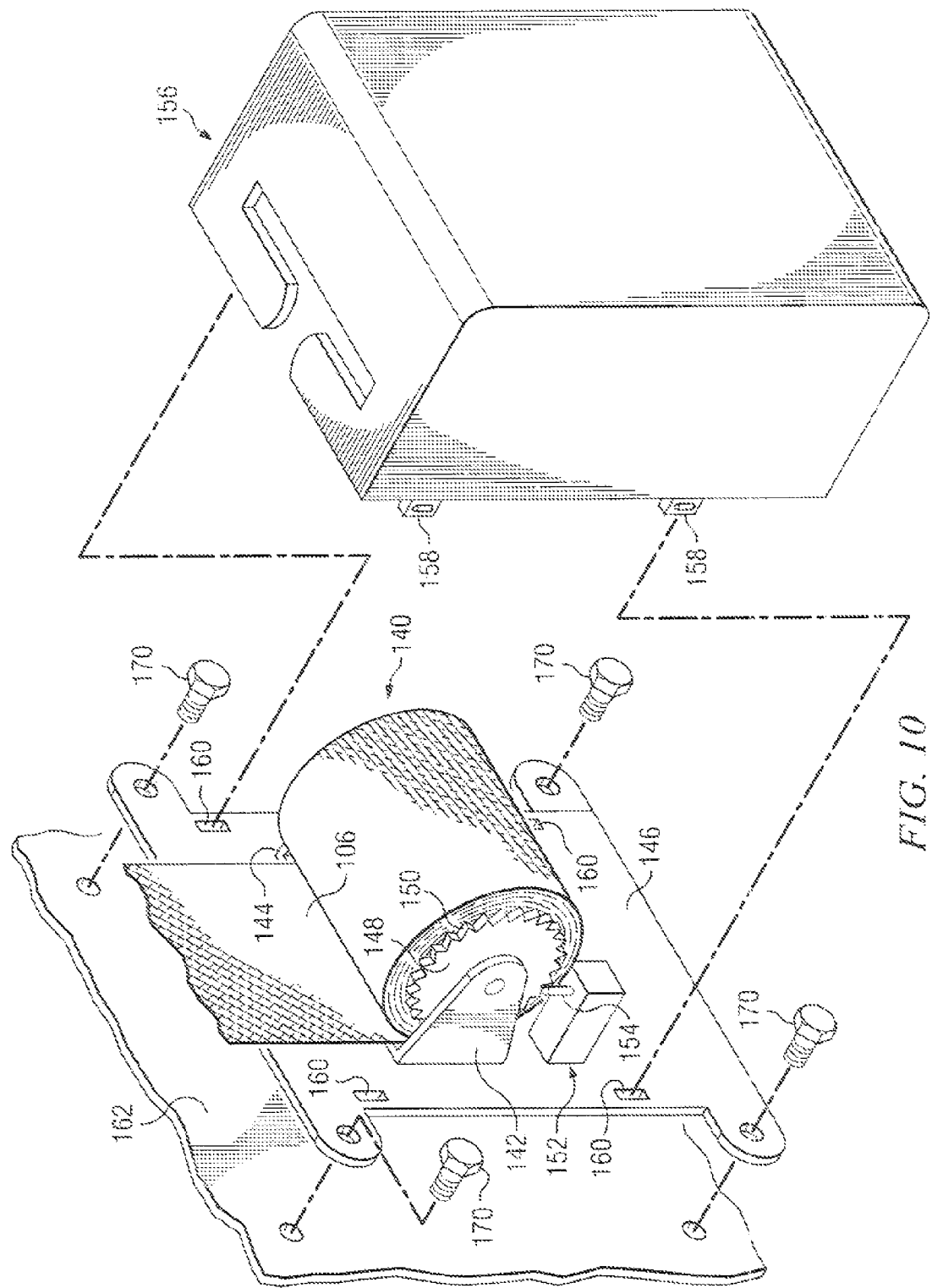
FIG. 10 is an exploded view depicting a left retractor of the left passenger restraint assembly.

The left retractor 110 can be configured to facilitate selective dispensation of the left belt 106 between a stored position (as illustrated in FIGS. 1-7) and an extended position (as illustrated in FIG. 8). In one embodiment, as illustrated in FIG. 10, the left retractor 110 can include a carrier 140. The left retractor 110 can also include left and right brackets 142, 144 that can be coupled with a retractor base 146, such as through welding. The carrier 140 can be rotatably supported by the left and right brackets 142, 144 with pins (not shown) journalled within the carrier 140. The carrier 140 can be coupled with the first end 126 of the left belt 106 such that the left belt 106 can be selectively dispensed through rotation of the carrier 140. In one embodiment, a tensioning member (not shown) can interact with the carrier 140 and at least one of the left and right brackets 142, 144 to bias the carrier 140 in a direction that facilitates collection of the left belt 106 onto the carrier 140 and also facilitates application of tension to the left belt 106 when the left belt 106 is at rest.

A disk 148 can be coupled with the carrier 140 and teeth 150 can be radially disposed about the disk 148. A braking assembly 152 can include a locking member 154 and can be secured to the retractor base 146 adjacent to the disk 148. During normal operation of the utility vehicle 14, the locking member 154 of the braking assembly 152 can remain disengaged from the teeth 150 such that the carrier 140 is free to rotate. However, if the utility vehicle 14 experiences sudden deceleration, such as during sudden braking, the locking member 154 can engage the teeth 150 to inhibit further rotation of the carrier 140 and resulting dispensation of the left belt 106. In one embodiment, the left retractor 110 can also include a pretensioner assembly (not shown) that is configured to detect sudden deceleration of the utility vehicle 14 and rotate the carrier 140 to increase tension on the left belt 106. The left retractor 110 can include a lid 156 that can be secured to the retractor base 146 through the interaction of tabs 158 with corresponding slots 160 of the retractor base 146. In one embodiment, protrusions provided on the tabs 158 can secure the tabs 158 within the slots 160 through an interference fit.

The right retractor 112 can be configured to facilitate selective dispensation of the right belt 108 between a stored position (as illustrated in FIGS. 1-7) and an extended position (as illustrated in FIG. 8) in a similar manner as is described with respect to the left retractor 110. For example, the right retractor 112 can include a carrier coupled with the right belt 108 that can facilitate selective dispensation of the right belt 108 between a stored position (as illustrated in FIGS. 1-7) and an extended position (as illustrated in FIG. 8). The right retractor 112 can also include a disk and braking assembly that are configured to selectively inhibit operation of the carrier if the utility vehicle 14 experiences sudden deceleration. It will be appreciated that, although the carrier 140 is shown in FIG. 10 to comprise a spool, it will be appreciated that a carrier can comprise any of a variety of suitable alternative arrangements that can facilitate selective dispensation of a belt.

Figure 11:
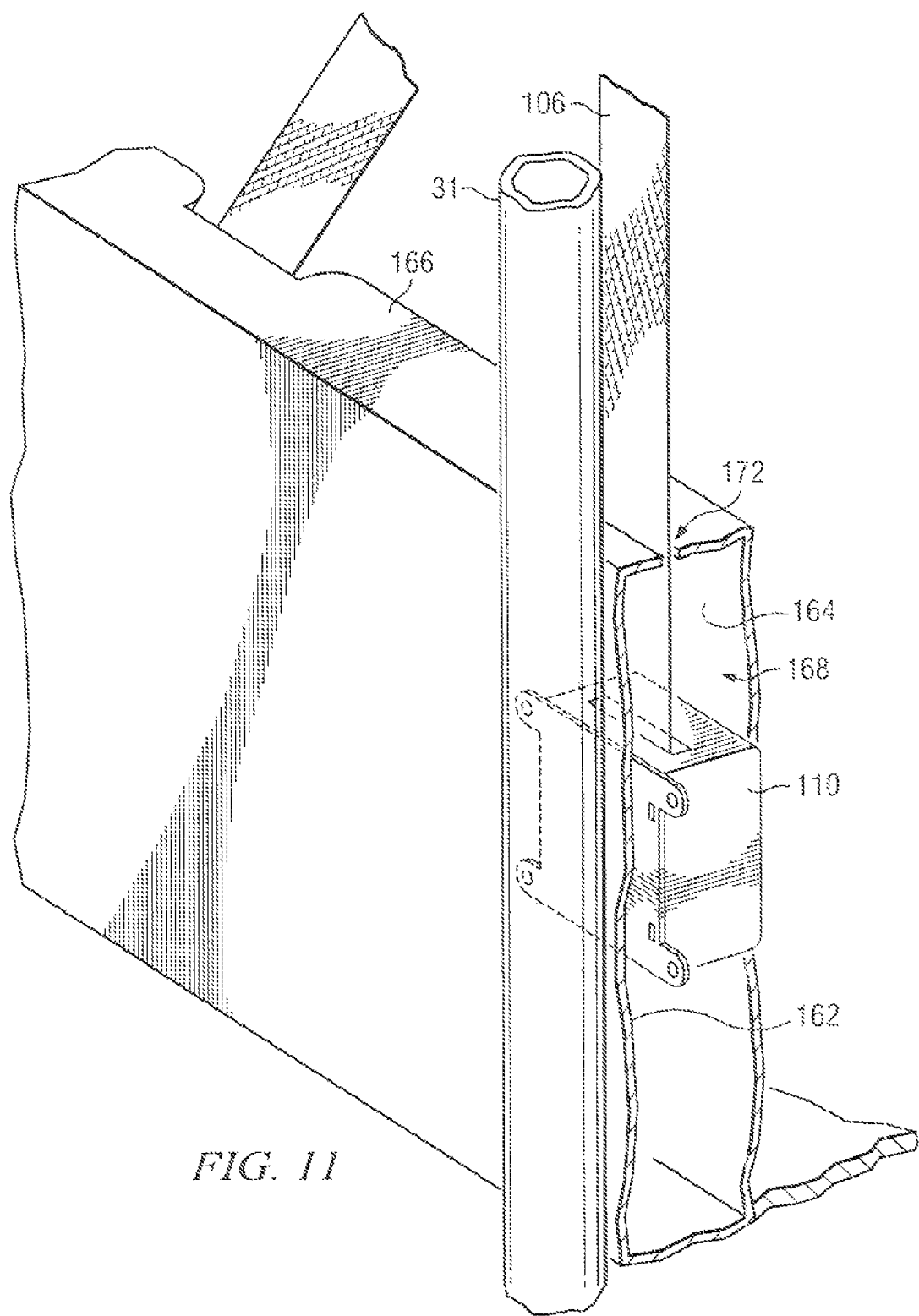
FIG. 11 is a cross-sectional view depicting the left retractor disposed within an inner area of the left side wall.

Referring now to FIG. 11, the left side wall 38 can include an outer wall 162, an inner wall 164, and an upper wall 166 that can cooperate to define an inner area 168. In one embodiment, the left retractor 110 can be disposed within the inner area 168. For example, as illustrated in FIG. 11, the left retractor 110 can be arranged between the outer and inner walls 162, 164 of the left side wall 38 and secured to the outer wall 162 (e.g., with bolts 170 shown in FIG. 10). In such an embodiment, the upper wall 166 of the left side wall 38 can define an opening 172 that is configured to facilitate selective dispensation of the left belt 106 from the inner area 168. It will be appreciated that by providing the left retractor 110 within the inner area 168, the left retractor 110 can be prevented from directly contacting cargo disposed within the utility bed 24 and/or from directly contacting passing debris. In addition, the left side wall 38 can prevent small debris (e.g., dirt) from entering the inner area 168 and thereby affecting proper operation of the left retractor 110. Moreover, the left retractor 110 can be hidden from view by the left side wall 38 which can provide attractive aesthetics for the utility bed 24. It will be appreciated that the left side wall 38 can be provided with any of a variety of scaling arrangements that can improve isolation of the left retractor 110 from external conditions. For example, a resilient sealing member can be provided around the opening 172 to prevent water from entering the inner area 168 and thereby affecting proper operation of the left retractor 110. It will be appreciated that the arrangement of the right retractor 112 within an inner area of the right side wall 40 can be similar in many respects as the arrangement of the left retractor 110 within the inner area 168 of the left side wall 38.

The left and right retractors 110, 112 and respective left and right channels 136, 138 are shown to be provided in portions of the left and right side walls 38, 40 that remain when the left and right doors 64, 66 are pivoted to their opened positions. When the left and right rear seats 98, 100 are deployed (e.g., through movement of the front wall 42, the front floor 56 and the left and right doors 64, 66, as described above), the left and right passenger restraint assemblies 102, 104 can be provided adjacent to the left and right rear seats 98, 100 and behind the left and right openings 65, 67 such that they are within reach of seated passengers (e.g., 122, 124).

It will be appreciated that, although the left and right passenger restraint assemblies 102, 104 are shown to facilitate three-point restraint of passengers (e.g., 122, 124), a passenger restraint assembly can be provided along a utility bed in any of a variety of suitable alternative configurations. For example, left and right passenger restraint assemblies can be configured as lap-belt assemblies to facilitate two-point restraint of passengers seated in the rear seats 98, 100.

Although the embodiments above have been described with respect to individual left and right rear seats, it will be appreciated that in other embodiments the utility bed can include more than two rear seats or less than two rear seats. In yet another embodiment, the utility bed can provide split rear seats. In such an embodiment, a front wall can be bifurcated into left and right portions. Each left and right portion can support a seat bottom. A front floor of the utility bed can be similarly bifurcated into left and right portions. Each left and right portion can support a seat back. In such an arrangement, left and right rear seats can be individually and selectively erected from the utility bed. It will also be appreciated that rear seats can be provided along a utility bed in any of a variety of suitable alternative arrangements. For example, rear seats can be rigidly affixed to a bed floor of a utility bed.

While various embodiments of a vehicle have been illustrated by the foregoing description and have been described in detail with respect to FIGS. 1-11, it is not intended to be exhaustive or to limit the scope of the appended claims to such detail. Numerous modifications are possible in light of the above teachings. Some of those modifications have been discussed and others will be understood by those skilled in the art.

What is claimed is:

1. A vehicle comprising:
   a vehicular frame;
   a utility bed pivotally coupled with the vehicular frame and pivotable between a hauling position and a dumping position, the utility bed comprising:
      a bed floor;
      a side wall; and
      a rear seat; and
   a passenger restraint assembly comprising:
      a securing member coupled with the utility bed adjacent to the rear seat;
      a belt comprising a first end, a second end, and a securing portion, the securing portion being configured for selective engagement with the securing member; and
      a retractor coupled with the side wall, the retractor comprising a carrier that is coupled with the first end of the belt and is configured to facilitate selective dispensation of the belt.

2. The vehicle of claim 1 wherein the side wall further comprises a door that is pivotable between an opened position and a closed position and the retractor is coupled with a remaining portion of the side wall.

3. The vehicle of claim 2 wherein:
   the side wall comprises an upper wall, an inner wall, and an outer wall;
   the upper wall, the inner wall, and the outer wall cooperate to define an inner area of the side wall; and
   the retractor is at least partially disposed within the inner area.

4. The vehicle of claim 3 wherein the upper wall of the side wall defines an opening that is configured to facilitate dispensation of the belt from within the inner area.

5. The vehicle of claim 2 wherein:
   the utility bed further comprises a bed frame and an end wall, the end wall being movably coupled with the bed frame and moveable between an erected position and a collapsed position;
   the bed floor comprises a first floor portion, the first floor portion being pivotable between an upright position and a cargo support position;
   a seat back is coupled with the first floor portion;
   a seat bottom is coupled with the end wall; and
   when the first floor portion is in the upright position with the end wall in the collapsed position, the seat back and the seat bottom cooperate to provide the rear seat.

6. The vehicle of claim 5 wherein the first floor portion comprises a front floor and the end wall comprises a front wall.

7. A utility vehicle comprising:
   a vehicular frame;
   a utility bed coupled with the vehicular frame and comprising:
      a bed floor;
      a side wall;
      a front wall; and
      a rear seat;
   a rear roll bar assembly coupled with at least one of the vehicular frame and the utility bed, the rear roll bar assembly being configured to provide overlying protection for the rear seat; and
   a passenger restraint assembly comprising:
      a securing member coupled with the utility bed adjacent to the rear seat;
      a belt comprising a first end, a second end, and a securing portion, the securing portion being configured for selective engagement with the securing member;
      a retractor coupled with the side wall, the retractor comprising a carrier that is coupled with the first end of the belt and is configured to facilitate selective dispensation of the belt; and
      a hanger member coupled with the rear roll bar assembly and configured to support the belt adjacent to the rear roll bar assembly.

8. The utility vehicle of claim 7 wherein the utility bed is pivotally coupled with the vehicular frame and is pivotable between a hauling position and a dumping position.

9. The utility vehicle of claim 7 wherein the side wall comprises a door that is pivotable between an opened position and a closed position, and the retractor is coupled with a remaining portion of the side wall.

10. The utility vehicle of claim 7 wherein:
    the side wall comprises an upper wall, an inner wall, and an outer wall;
    the upper wall, the inner wall, and the outer wall cooperate to define an inner area of the side wall; and
    the retractor is at least partially disposed within the inner area.

11. The utility vehicle of claim 10 wherein the upper wall of the side wall defines an opening that is configured to facilitate dispensation of the belt from within the inner area.

12. The utility vehicle of claim 7 wherein the securing member comprises a latch coupled with the rear seat and the securing portion of the belt comprises a tongue member that is configured for selective positioning along the belt.

13. The utility vehicle of claim 7 wherein:
the bed floor comprises a first floor portion, the first floor portion being pivotable between an upright position and a cargo support position;
the utility bed further comprises:
a bed frame;
an end wall movably coupled with the bed frame and moveable between an erected position and a collapsed position;
a seat back coupled with the first floor portion; and
a seat bottom coupled with the end wall; and
when the first floor portion is in the upright position with the end wall in the collapsed position, the seat back and seat bottom cooperate to provide the rear seat.

14. The utility vehicle of claim 13 wherein the first floor portion comprises a front floor and the end wall comprises a front wall.

15. A utility vehicle comprising:
a vehicular frame;
a utility bed pivotally coupled with the vehicular frame and pivotable between a hauling position and a dumping position, the utility bed comprising:
a bed frame;
a bed floor comprising:
a rear floor coupled with the bed frame; and
a front floor pivotally coupled with the rear floor and being pivotable between an upright position and a cargo support position;
a front wall pivotally coupled with the bed frame and pivotable between an erected position and a collapsed position;
a left side wall comprising a left door that is pivotable between an opened position and a closed position; and
a right side wall comprising a right door that is pivotable between an opened position and a closed position;
a left seat back coupled with the front floor;
a right seat back coupled with the front floor;
a left seat bottom coupled with the front wall; and
a right seat bottom coupled with the front wall;
a rear roll bar assembly coupled with the bed frame and comprising a left roll bar member and a right roll bar member;
a left passenger restraint assembly comprising:
a left securing member coupled with the front wall adjacent the left seat bottom;
a first belt comprising a first end, a second end, and a first securing portion, the first securing portion being configured for selective engagement with the left securing member; and
a first retractor coupled with the left side wall, the first retractor comprising a first carrier coupled with the first end of the first belt and configured to facilitate selective dispensation of the first belt;
a right passenger restraint assembly comprising:
a right securing member coupled with the front wall adjacent the right seat bottom;
a second belt comprising a third end, a fourth end, and a second securing portion, the second securing portion being configured for selective engagement with the right securing member; and
a second retractor coupled with the right side wall, the second retractor comprising a second carrier coupled with the third end of the second belt and configured to facilitate selective dispensation of the second belt;
a left hanger member coupled with the left roll bar member and configured to support the first belt adjacent to the left roll bar member; and
a right hanger member coupled with the right roll bar member and configured to support the second belt adjacent to the right roll bar member;
wherein, when the front floor is in the upright position with the front wall in the collapsed position, the left seat back and the left seat bottom cooperate to provide a left rear seat and the right seat back and the right seat bottom cooperate to provide a right rear seat.

16. The utility vehicle of claim 15 wherein:
the left side wall comprises a left upper wall, a left inner wall, and a left outer wall;
the left upper wall, the left inner wall, and the left outer wall cooperate to define a left inner area of the left side wall;
the first retractor is at least partially disposed within the left inner area;
the right side wall comprises a right upper wall, a right inner wall, and a right outer wall;
the right upper wall, the right inner wall, and the right outer wall cooperate to define a right inner area of the right side wall; and
the second retractor is at least partially disposed within the right inner area.

17. The utility vehicle of claim 16 wherein the left upper wall of the left side wall defines a left opening that is configured to facilitate dispensation of the first belt from within the left inner area and the right upper wall of the right side wall defines a right opening that is configured to facilitate dispensation of the second belt from within the right inner area.

18. The utility vehicle of claim 16 wherein the left inner wall defines a left channel that is configured to receive the first belt and the right inner wall defines a right channel that is configured to receive the second belt.

* * * * *

UNITED STATES PATENT AND TRADEMARK OFFICE
CERTIFICATE OF CORRECTION

PATENT NO. : 8,353,534 B2  
APPLICATION NO. : 12/646160  
DATED : January 15, 2013  
INVENTOR(S) : Arnold et al.

Page 1 of 1

It is certified that error appears in the above-identified patent and that said Letters Patent is hereby corrected as shown below:

Title Page, Item (57)  
Abstract section, fourth line, change "scat" to --seat--;  
Abstract section, seventh line, change "first end;" to --first end,--;

In the Specification  
Column 1, line 37, change "scat" to --seat--;  
Column 1, line 43, change "scat" to --seat--;  
Column 3, line 26, change "example, in" to --example. In--;  
Column 3, line 28, change "e.g." to --e.g.,--;  
Column 3, line 35, change "scat" to --seat--;  
Column 4, line 10, change "e.g." to --e.g.,--;  
Column 4, line 63, change "hearings" to --bearings--;  
Column 6, line 11, change "kit" to --left--;  
Column 6, line 34, change "car" to --can--;  
Column 7, line 50, change "hack" to --back--;  
Column 7, line 50, change "scat" to --seat--;  
Column 7, line 57, change "scat" to --seat--;  
Column 7, line 61, change "scat" to --seat--;  
Column 8, line 31, change "scat" to --seat--;  
Column 10, line 61, change "scaling" to --sealing--;  
Column 11, line 26, change "scats" to --seats--; and  
Column 11, line 32, change "scat" to --seat--.

Signed and Sealed this  
Ninth Day of April, 2013

Teresa Stanek Rea  
*Acting Director of the United States Patent and Trademark Office*